L. D. LOVEKIN.
LEVEL INDICATING GAGE.
APPLICATION FILED AUG. 26, 1908.
925,361.
Patented June 15, 1909.
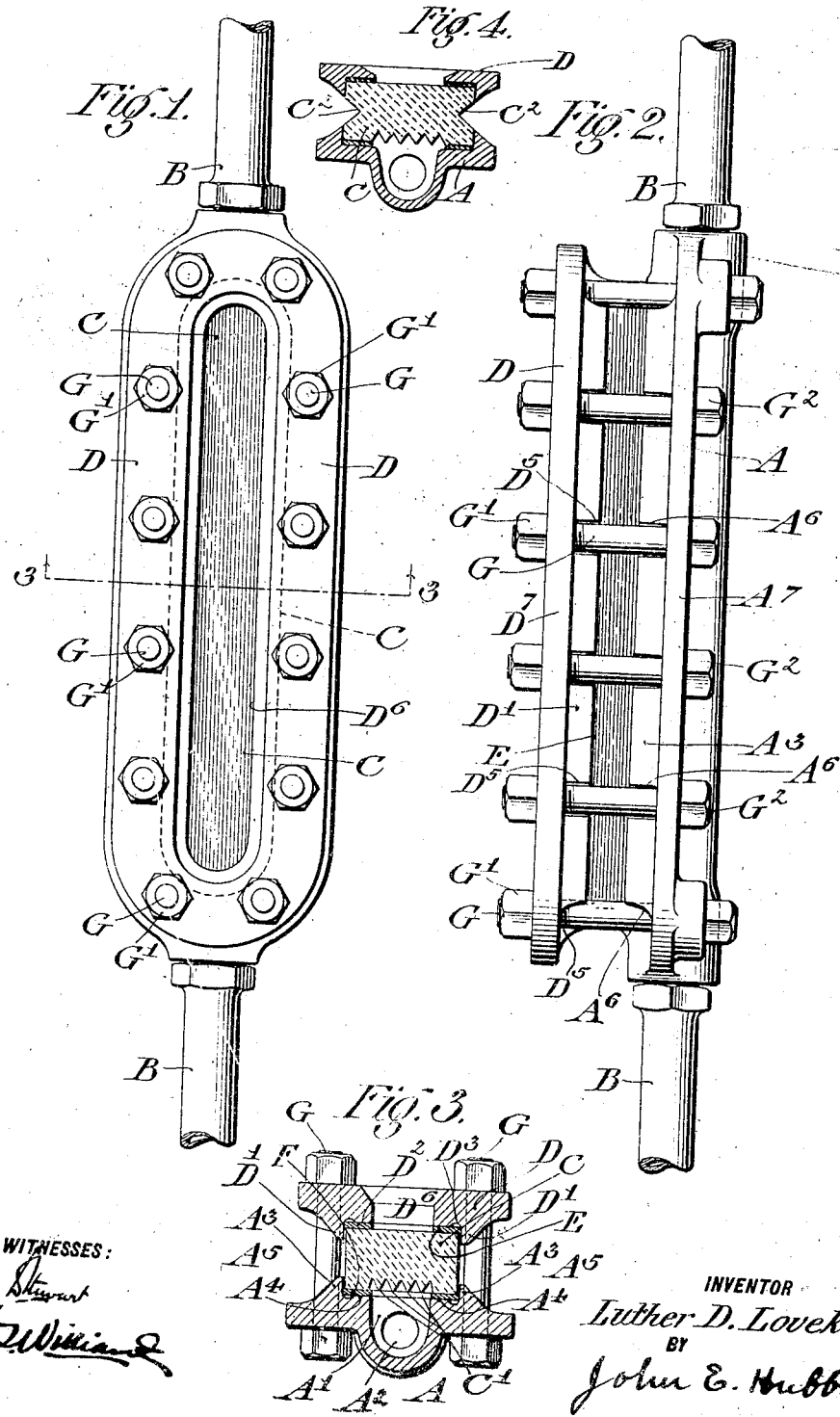
WITNESSES:
INVENTOR
Luther D. Lovekin
BY
John E. Hubbell
ATTORNEY.

UNITED STATES PATENT OFFICE.

LUTHER D. LOVEKIN, OF PHILADELPHIA, PENNSYLVANIA.

LEVEL-INDICATING GAGE.

No. 925,361.  Specification of Letters Patent.  Patented June 15, 1909.

Application filed August 26, 1908. Serial No. 450,282.

*To all whom it may concern:*

Be it known that I, LUTHER D. LOVEKIN, a citizen of the United States of America, residing in the city and county of Philadelphia, in the State of Pennsylvania, have invented a certain new and useful Improvement in Level-Indicating Gages, of which the following is a true and exact description, reference being had to the accompanying drawings, which form a part thereof.

My present invention relates to level indicating gages, such as the so-called water glasses, for steam boilers, and particularly to that type of gage disclosed by United States patent to Richard Klinger, No. 470,856, issued March 15th, 1892, in which a block of glass closing the otherwise open side of a chamber provided in a metallic body is formed with reflecting surfaces in its inner face, so arranged that the glass is practically opaque, except where said facets are covered with water.

The object of the present invention is to simplify and improve the construction of gages of this type, make them easier to read, and to make them better able to withstand the conditions of use to which they may be subjected. The latter object is obtained, in a large measure, by so constructing and arranging the parts forming the water glass, that the temperature of the external surfaces of the glass is kept much lower than in gages of this type heretofore employed.

The various features of novelty which characterize my invention are pointed out with particularity in the claims annexed to and forming a part of the specification. For a better understanding of the invention, however, and the advantages possessed by it, reference may be had to the accompanying drawings and descriptive matter in which I have illustrated and described one of the forms in which my invention may be embodied.

In the drawings: Figure 1 is a front elevation of the new gage. Fig. 2 is a side elevation of the gage shown in Fig. 1. Fig. 3 is a sectional plan taken on the line 3—3 of Fig. 1; and Fig. 4 is a view similar to Fig. 3 showing a modified construction.

In the drawings, A represents the body portion of the gage formed with a steam and water containing chamber $A^1$, which terminates at the top and bottom in ports $A^2$ communicating with the tubes B, B which may be connected to the body of the gage in any manner. The front side of the chamber $A^1$ is open and is surrounded by a plane seat $A^4$ and the latter in turn usually by a rim or flange $A^3$.

The glass body C is in the form of a bar having rounded ends as indicated in Fig. 1 and is formed in its inner face with V shaped ribs $C^1$, the sides of which form reflecting surfaces, which extend parallel to the length of the gage. The glass C is secured in place to close the otherwise open front side of the chamber $A^1$ by skeleton retaining means, which, in the form shown, comprises bolts G, a rim like member D provided with a plane seat $D^2$ surrounding the aperture $D^6$, through which the gage indications may be observed, and with a flange $D^1$, which surrounds the seat $D^2$. The bolts G, which extend through flanges $A^7$ and $D^7$ of the members A and D respectively, are provided with the usual polygonal heads $G^2$ and polygonal nuts $G^1$. A cushion E and a gasket F, formed of suitable material, are inserted between the seats $D^2$ and $A^4$ and the adjacent surfaces of the glass body C. Preferably as shown, the flange portions $D^1$ and $A^3$ of the members D and A are recessed at $D^5$ and $A^6$ respectively to permit the bolts G to be brought close to the edges of the glass bar C. Recesses $D^3$ and $A^5$ are formed at the outer margins of the seats $D^2$ and $A^4$ respectively, so that the cushion and gasket, which may be formed of material more or less elastic, or may have rough edges, will not interfere with the formation of smooth tight joints.

With the construction disclosed, the skeleton means for securing the glass body C in place are so arranged as to allow only a comparatively small amount of heat to be transferred by conduction or radiation from the body A to the rim member D. In consequence of this fact and the fact that the glass body C is exposed at the sides and ends between the adjacent edges of the flanges $A^3$ and $D^1$, as well as through the space $D^6$ in the rim member D, the temperature of the portions of the glass body C remote from the surface of the glass body adjacent the chamber $A^1$ and particularly the exposed surfaces of the glass body C, are maintained at a temperature appreciably nearer that of the atmosphere than has been the case with gages of this type heretofore made. On account of this fact, the glass is less apt to break than was the case with the older construction. A frequent cause of breaking of the glass bodies in gages of this type, as they have heretofore been constructed, has been the sudden changes in temperature to which the exposed surfaces of the glass bodies were subjected. In particular, gages for marine work are apt to be spattered from time to time in the winter season with icy spray passing into the boiler room through the ventilators. This has been usually sufficient to destroy the glass bodies in gages of this kind heretofore used, while with my new gage, the lower normal temperature of the external surface of the glass body enables the latter to withstand such spray action or the action of blasts of cold air or water.

A further and important advantage of the construction disclosed is found in the fact that the light admitted at the sides of the glass results in making the gage indications much easier to read, since the light thus admitted gives the inner surface of the glass above the water level a very bright and shining appearance, so that the water line is extremely distinct. This is particularly important where the gage is used in a dark place so that artificial illumination is necessary. In such cases, a light may be placed at one or at each of the two long sides of the gage. This location of the lamps at the side of the gage rather than in front of it, is in itself an advantage, particularly where, as is frequently the case, in marine work, it is necessary to have gages viewed from two levels, one above and one below the level of the gage. To increase the effectiveness of this side lighting effect, I may provide grooves $C^2$ in the edges of the glass as shown in Fig. 4.

An important advantage of the construction disclosed over that heretofore known is found in the fact that the bolts connecting the body A and rim member D are so arranged as to permit of a definite and determined clamping action, and in the fact that when the gage leaks, it is possible to readily locate the leakage and to tighten up whichever of the clamping bolts need to be tightened and to readily determine whether the gasket needs to be replaced. The fact that the rim member in this construction is slightly flexible facilitates the proper clamping of the glass in place.

I am aware that in the gage shown by the Klinger patent the body and the front frame member do not meet, but the space left in the gage of the Klinger patent is provided only for clearance, and on account of the thinness of the space and its relatively great depth parallel to the front and back surfaces of the glass, the space is not effective either to admit light to the interior of the glass or to materially reduce the temperature of the exposed surfaces of the glass body.

Having now described my invention, what I claim as new and desire to secure by Letters Patent is:

1. A gage glass comprising a body member formed with a chamber open at one side, a relatively thick glass body closing the open side of said chamber, and skeleton retaining means for securing the glass body in place against said body member, while leaving a large portion of the front face and edges of said glass body exposed.

2. A gage glass comprising a body member formed with a chamber open at one side, a relatively thick body of glass for closing the open side of said chamber and formed with reflecting surfaces on the side adjacent said chamber, and means for clamping said glass body in place, comprising a metallic rim or open frame engaging the front face of the glass body and spaced away from said body to expose a large portion of the side edges of said glass body, and bolts connecting said rim and body members.

3. A gage glass comprising a body member formed with a chamber open at one side, a relatively thick glass body closing the open side of said chamber and formed with grooves in its side edges, and skeleton retaining means for securing the glass body in place against said body member, while leaving a large portion of the front face and the grooved portions of the side edges of said glass body exposed.

LUTHER D. LOVEKIN.

Witnesses:
ARNOLD KATZ,
D. STEWART.